United States Patent [19]

Grove et al.

[11] Patent Number: 4,558,869
[45] Date of Patent: Dec. 17, 1985

[54] COVERING FOR ROTATING FLEXIBLE AXLE JOINTS

[75] Inventors: Clinton E. Grove, Elbow Lake; Jeffery O. Golberg, Glenwood, both of Minn.

[73] Assignee: Niwot Corporation, Longmont, Colo.

[21] Appl. No.: 642,839

[22] Filed: Aug. 21, 1984

Related U.S. Application Data

[63] Continuation-in-part of Ser. No. 376,766, May 10, 1982, abandoned.

[51] Int. Cl.$^4$ .......................... F16J 15/54; F16D 3/84
[52] U.S. Cl. ........................................... 277/1; 277/9; 277/212 FB; 464/175; 156/308.6
[58] Field of Search ............... 277/212 FB, 9, 1; 138/128, 162, 166; 428/36; 464/131, 133, 145, 146, 173, 175, 906; 403/50, 51; 285/226; 74/18, 18.1, 18.2; 156/308.6, 308.8

[56] References Cited

U.S. PATENT DOCUMENTS

| | | | |
|---|---|---|---|
| 1,871,883 | 8/1932 | Geyer | 464/173 |
| 2,025,635 | 12/1935 | Bishoff | 464/173 |
| 2,226,388 | 12/1940 | Richter | 74/18.1 X |
| 2,378,046 | 6/1945 | Stergis | 464/175 X |
| 3,300,370 | 1/1967 | Epstein et al. | 156/308.6 X |
| 3,322,476 | 5/1967 | Lewis | 277/9 X |
| 3,638,503 | 2/1972 | Stipanovic et al. | 74/18.2 X |
| 3,961,799 | 6/1976 | Peet | 277/9 |
| 3,962,889 | 6/1976 | Stillwagon | 464/133 X |
| 4,210,002 | 7/1980 | Doré | 464/175 |
| 4,360,209 | 11/1982 | Urai et al. | 464/175 |

FOREIGN PATENT DOCUMENTS

| | | | |
|---|---|---|---|
| 550651 | 9/1956 | Belgium | 277/212 FB |
| 706519 | 5/1941 | Fed. Rep. of Germany | 74/18.2 |
| 1245236 | 7/1967 | Fed. Rep. of Germany | 277/212 FB |
| 2304042 | 8/1974 | Fed. Rep. of Germany | 74/18.2 |
| 233072 | 9/1944 | Switzerland | 74/18.1 |
| 576164 | 3/1946 | United Kingdom | 156/308.6 |
| 2031530 | 4/1980 | United Kingdom | 277/212 FB |

OTHER PUBLICATIONS

*Basic Auto Repair Manual*, Petersen Pub. Co. (Los Angeles, 1972), Front Cover and pp. 2, 344 and 345.
*Volkswagen Service-Repair Handbook*, Clymer Publications (Los Angeles, 1961–1974 Volkswagens), Front Cover, Title Page and p. 230.
*Materials in Design Engineering*, Manual No. 145, Jan. 1958, "Joining and Fastening Plastics", Malcolm W. Riley, pp. 129–139.

*Primary Examiner*—Robert S. Ward
*Attorney, Agent, or Firm*—Dorsey & Whitney

[57] ABSTRACT

A boot for enclosing a flexible rotating joint. The boot body has a generally tubular shape with end openings and at least one longitudinal seam running from one end opening to the other. The seam is formed by two edges. One edge mates with the other edge to form a boot with an annular cross-section. The edges of the seam are interbonded to one another by a thin, flexible bond extending along the contact surface between them. Adapter rings placed within the end openings permit a single boot size to be fitted to several different axle and housing sizes and shapes.

20 Claims, 11 Drawing Figures

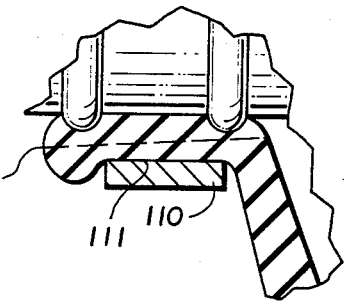
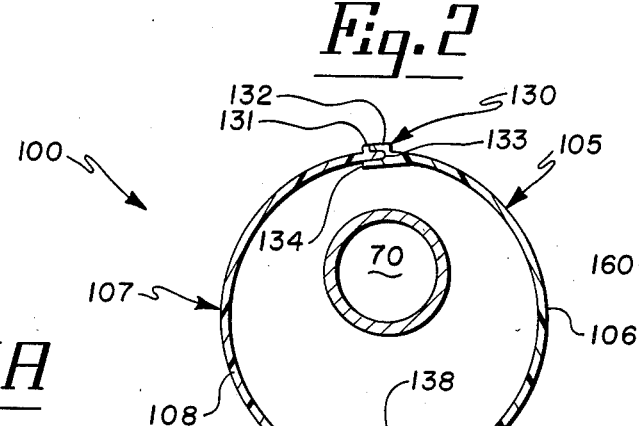
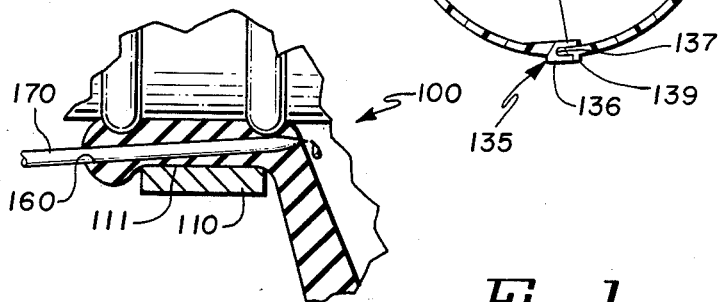
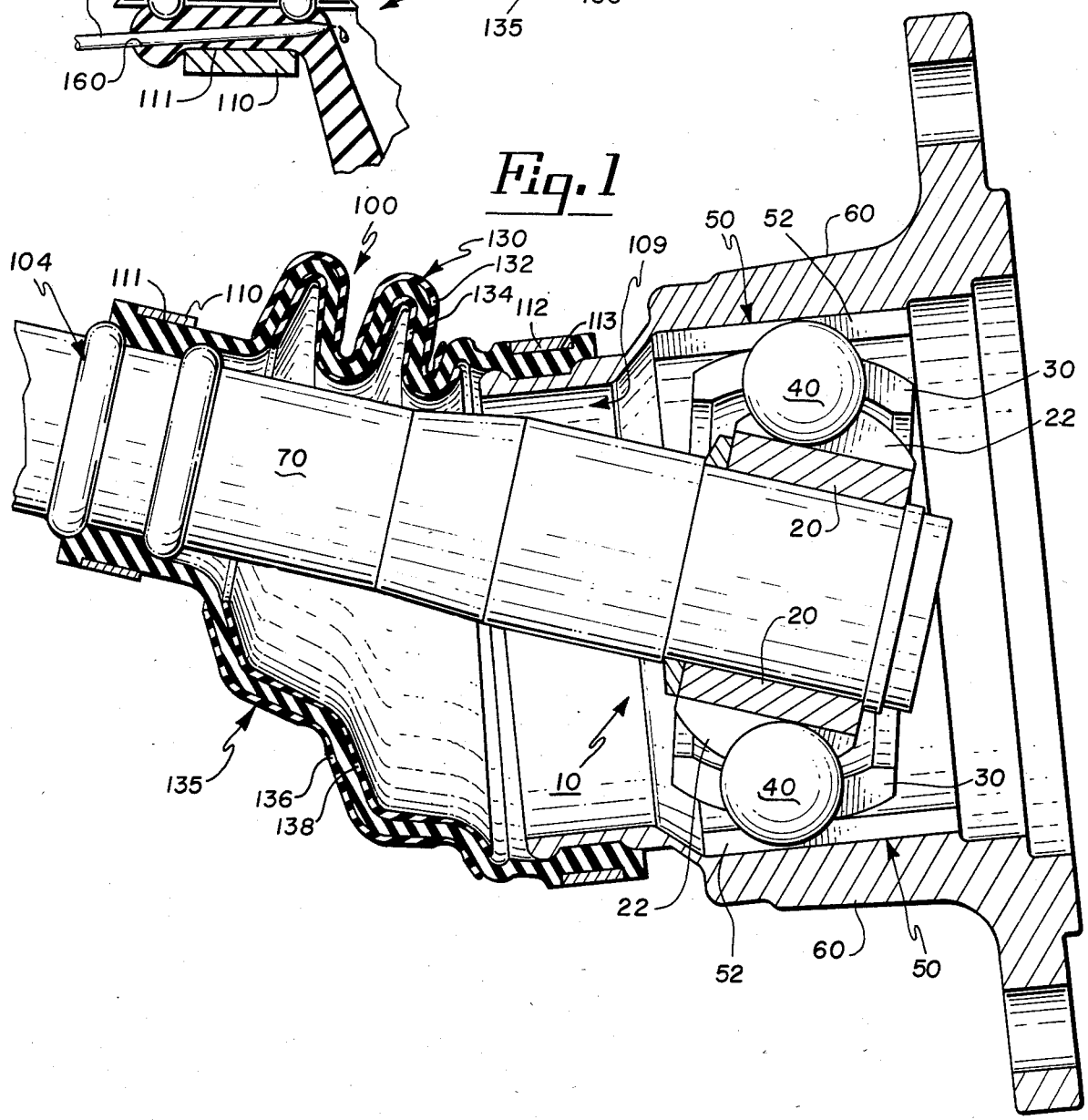

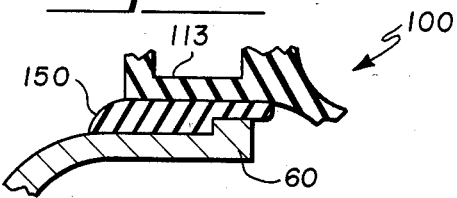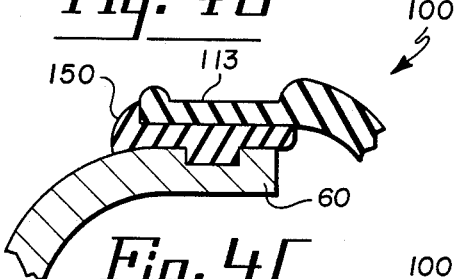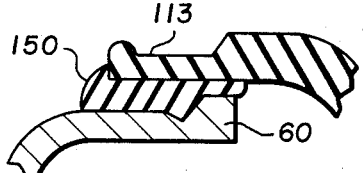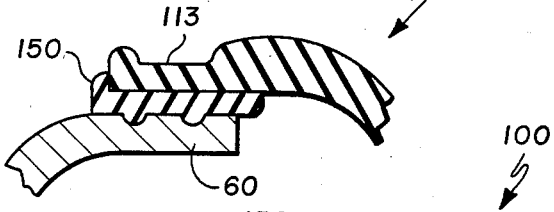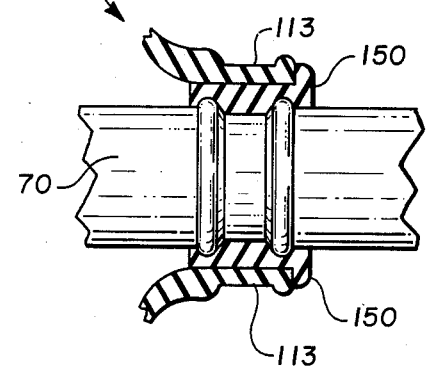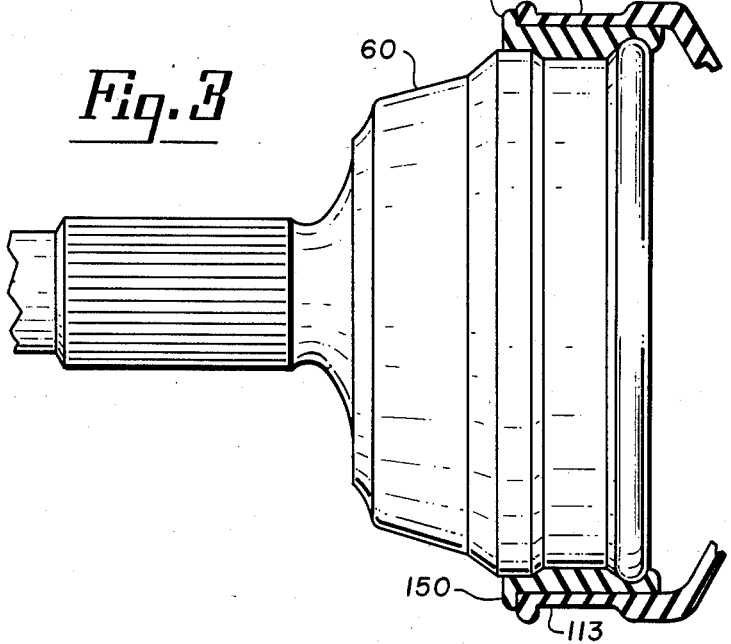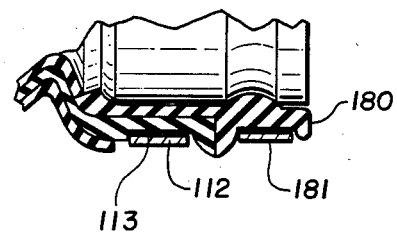

COVERING FOR ROTATING FLEXIBLE AXLE JOINTS

BACKGROUND OF THE INVENTION

This is a continuation-in-part of application Ser. No. 06/376,766, filed May 10, 1982 and now abandoned.

1. Field of the Invention

This invention relates to a covering or boot for enclosing rotating flexible axle joints and, more particularly, to a covering or boot for universal or constant velocity joints of drive shafts on various types of motor vehicles.

2. Description of the Prior Art

Flexible rotating joints are used in a variety of applications, including motor vehicles. Such joints include the conventional cross and bearing type universal joints, as well as constant velocity joints of more recent ball-and-socket or tripod-principle design, with or without a "plunging" feature to allow elongation as well as flexing. Such joints have become widely used in front-wheel drive vehicles, which are being sold in increasingly greater numbers.

Many flexible rotating joints are enclosed in protective coverings or boots made of synthetic rubber, which turn with the joint and are intended to retain lubrication around the joint and to prevent outside contaminants from reaching the working surfaces of the joint. Because such protection of the joint guards against premature joint failure, coverings or boots are normally replaced whenever inspection reveals a hole, a split or wear of any kind. Replacement can often prevent a later, more costly repair.

In the most commonly sold and serviced motor vehicles, particularly in the various new front-wheel drive cars, a one-piece boot or covering which is conical or tubular in shape is used to cover flexible, rotating joints. See, e.g., U.S. Pat. No. 4,224,808. While removal of an old boot does not require disassembly of the joint, because it can simply be torn or cut, installation of a new tubular boot requires that the axle shaft be threaded through the boot. This means that the joint or axle must be partially disassembled and separated so that the threading operation can occur. The result is high labor costs for an otherwise relatively simple task and the possibility of disturbing the somewhat complex structure of such joints and their accompanying axle assemblies. To avoid these problems, a boot is needed which can be installed quickly and easily, without disassembly of joint or axle.

Conventional boots or joint coverings also suffer from another drawback. Because the outer edges of both ends of the boot must fit tightly against the shaft or housing on either side of the joint, boots are usually made to fit only one, specific axle size or shape. Accordingly, a repair shop must keep a large inventory of boots of various sizes and shapes, and the manufacturer of boots must be prepared to make and distribute an inventory which includes a large number of boots which differ only by size or shape.

Most conventionally available boots are made of synthetic rubber, although boots made of leather, fabric, thin metal, synthetic thermoplastic, polypropylene and other elastomers have all been proposed. See, e.g., U.S. Pat. Nos. 2,227,687; 2,411,874; 3,660,213; 4,107,952; 4,222,805. Although a split or seamed boot could be made out of such materials, there may be some difficulty in rapidly forming a strong but flexible, well-sealed closure at the split or seam. This sealed closure is quite important for protecting the joint and is subject to frequent flexing and stressing as the boot turns with the joint, particularly when a joint is operating at larger angles, in some applications up to 45 degrees. Other qualities necessary for a boot and its closure are resistance to abrasion and extremes of heat and cold, resistance to lubricants and other chemicals commonly found in the vehicle and road environment and strength to withstand frequent flexing.

The split boots known in the prior art have used a variety of mechanical arrangements to hold the boot at the split or seam. These arrangements include: stitching or lacing (U.S. Pat. No. 2,378,046); rivets (Belgian Pat. No. 50,651); zippers (U.S. Pat. No. 2,025,635 and German Pat. No. 706,579); and long spring clips (German Pat. No. 1,245,236). The disadvantages associated with such mechanical closures are several. A continuous, watertight seam of high and uniform strength is difficult to create with discrete mechanical elements or a closure element which exerts weaker closing force at some points than at others. If many mechanical closure elements are used, installation is difficult and time-consuming. Mechanical arrangements also add weight at the seam, which causes the boot to lack symmetrical weight distribution and rotational balance. Mechanical arrangements may inhibit flexing of the boot and may cause specific wear spots at the point where a rivet or clip is located. Mechanical arrangements may be subject to metal (or other material) fatigue after repeated flexing or be exposed and vulnerable to corrosion. Mechanical arrangements may also loosen through flexing or vibration or may catch on nearby parts, because the closure elements usually are external to and extend outward from the seam. Differences in the flexing characteristics of mechanical elements and the boot itself may also affect wear and boot shape under rotation. Accordingly, a split boot with an improved seam and seam closure means has been needed.

SUMMARY OF THE INVENTION

The present invention involves a boot for sealingly enclosing a joint which is designed to overcome the above-identified problems of the prior art. The boot comprises a boot body of flexible, resilient material in the shape of a generally tubular bellows segment including a thin wall and first and second end openings. Each of these end openings encircles a shaft or housing which is part of the joint. The boot body also has at least one longitudinal split or seam running from one end opening to the other and has an external clamp groove encircling each end opening. The boot further includes clamping means cooperating with the external clamp grooves at each end to encircle each of the end openings and compress the interior surface of each of the end openings radially inward toward the shaft or housing encircled by each end opening. The boot seam includes a first edge and a mating second edge, the mating surfaces of which are interbonded to one another by a flexible, thin bonding layer.

In the preferred embodiment, the first edge has substantially the same thickness as the wall of the boot body, while the second edge has a generally U-shaped channel formed on it for mating with the first edge. The U-shaped channel is open toward the first edge and has sufficient space between its legs to receive the first edge of the joint. The channel is aligned on the second edge so that upon joining, the first and second edges are substantially aligned with each other to form a tubular bellows with a substantially annular cross section of uniform thickness.

The principal objectives of the invention are: (a) to provide a boot for covering a flexible, rotating axle joint which can be placed around the joint without disassembling it; (b) to provide a boot which is made of a material which can withstand the temperature extremes and the lubricants and other chemicals in a vehicle and road environment; (c) to provide a boot which can be adapted to fit several sizes and shapes of axle shafts; (d) to provide a boot which can be easily manufactured from moldable or plastic materials; (e) to provide a boot which can rotate with the axle it encloses without significant rotational distortion of its annular cross-section; (f) to provide a split boot which can be joined by mating first and second edges with mating surfaces which are interbonded to one another by a continuous, flexible, thin bonding layer, rather than external or piercing mechanical means, to produce a watertight, sealed seam at the split; and (g) to provide a split boot with a sealed seam that adds little thickness to the boot wall and that does not significantly affect boot flexibility.

BRIEF DESCRIPTION OF THE DRAWINGS

FIG. 1 is a longitudinal cross-sectional view of a constant velocity joint assembly with a boot according to the present invention installed around it.

FIG. 2 is a transverse cross-sectional view of the boot of the present invention.

FIG. 3 is a cross-sectional view of one end of the boot of the present invention as used with an internal diameter adapter ring.

FIGS. 4A-4E are detail drawings showing the cross-sectional configurations of various internal diameter adapter rings for the end openings of the boot of the present invention.

FIGS. 5A-5B are detail drawings showing a grease fitting feature of the invention.

FIG. 6 is a detail drawing showing the cross-sectional configuration of a length adapter ring.

DESCRIPTION OF THE PREFERRED EMBODIMENT

As best seen in FIG. 1, the preferred embodiment of the present invention involves a boot or covering 100 which forms part of the enclosure for a rotatable, flexible joint, such as the constant velocity joint 10 shown. Such a constant velocity joint 10 is usually part of a driving axle assembly for a motor vehicle; however, they may also be found in other applications. The boot 100 of the present invention may be adapted to a wide variety of motor vehicle applications and also may be used with other mechanical structures subject to elongation and bending where protection against loss of lubricants and entrance of foreign material is desired.

The various parts forming the constant velocity joint 10 can best be seen in FIG. 1, which shows a particular type of constant velocity joint called a ball-type fixed joint. The name is derived from the plurality of drive ball bearings 40 (usually six), which are contained in a cage 30. Inside the cage 30, the drive ball bearings 40 rest in the grooves 22 of an inner race or drive member 20. Surrounding the cage 30 and the ball bearings 40 is an outer drive member in the form of a fixed joint housing 60 which includes as part of its interior an outer race 50 having ball-bearing grooves 52, radially paired with the grooves 22 of the inner race 20. The inner race 20 is spline-connected to the axle shaft 70. The outer drive member or housing 60 is connected to the axle or hub assembly on the side of the joint 10 opposite the axle shaft 70.

This type of joint operates in a well-known manner to provide constant velocity operation when rotated under angle. Briefly, the cage 30 pivots on the inner drive member 20 about centers equally offset from the universal joint center when the joint 10 is bent at an angle to maintain the drive ball-bearings 40 in the half-angle or constant velocity plane for constant velocity operation. Within the degree of motion afforded by the inner race 20 and outer race 50, the shaft 70 may assume various acute angles to the axis of rotation of the housing 60. Such joints may operate at angles up to forty-five degrees to accomodate steering motion and speeds in excess of 1500 r.p.m.

Although in the following the preferred structure and operation of the invention will be described in the context of a fixed, ball-type constant velocity joint as shown in FIG. 1, it will be apparent that the invention is equally applicable to a stroking or plunging-type ball joint or to a tripod-type constant velocity joint of either the fixed or plunging type.

Referring now to FIGS. 1 and 2, it can be seen that the preferred embodiment comprises a bellows-type boot or covering 100 which is roughly tubular in shape and has two end openings 104, 109. In the embodiment shown in FIG. 1, the end opening 104 is smaller than the end opening 109, making the boot 100 somewhat conical, but this shape would not always be used and is not essential to the invention.

As one of the objects of the invention is to permit the boot 100 to be installed without disassembling the constant velocity joint 10 or any other portion of the axle assembly, the boot 100 has at least one longitudinal seam or split which runs along the side of the boot 100 from one end opening to the other. As best seen in FIG. 2, the preferred embodiment of the invention includes two seams, 130, 135 which are located symmetrically on opposite sides of the boot 100. The seams 130, 135 are formed by constructing each boot 100 from two identical boot-halves 105, 107. The connection between the two halves 105, 107 is facilitated by mating means, preferably channels 133, 137 formed along one edge of each boot-half 105, 107, which mates with the other edge of the opposing boot-half 107, 105.

The detailed construction of the mating edges at connection seam 130 is best shown in FIG. 2. From that figure, it can be seen that the sides or legs 132, 134 of the channel 133 are relatively thinner than the wall 106 of the boot half 105 of which they are a part and that the inner leg 134 is slightly longer than the outer leg 132. The space between the legs 132, 134 is dimensioned so as to snugly receive the edge of the wall 108 of the opposite boot-half 107. The connection between the edge of the wall 108 and the channel 130 on wall 106 with which it mates is by a thin, flexible bond internal to the seam 133, described in greater detail below. The seam 135 is constructed in an identical manner.

To facilitate easy joining of the two convoluted boot-halves 105, 107, the edge of each wall 106, 108 which is mated with a corresponding channel 133, 137 to form a seam is rounded or chamfered so that it can be placed more easily into mating relationship. Alignment and insertion of the mating edges along the convoluted seam is aided and guided by the longer inner legs 134, 138. To serve as an indicator that the edges are fully inserted into and mated with the channels 133, 137 and to provide a surface which temporary curing clips (not shown) may grasp for holding the seams 130, 135 together during curing of the bond, ribs 131 and 139 may be provided along the exterior sides of walls 106, 108 near the inserted edges. Alternatively, the surface texture of an inserted edge can be roughened in the area to be inserted to contrast with a smooth surface outside the insertion area.

It should be noted that the mass of an individual leg 132, 134 and 136, 138 or rib 131, 139 is relatively small in comparison to a segment of comparable width in one of the walls 106, 108, due to the thinness of the leg or rib. In addition, it should be noted that the symmetrical placement of the channels 133, 137 on the edges of the boot-halves 105, 107 permits the walls 106, 108 of the boot 100 to extend in a circle with almost no assymetries or discontinuities except for small increases in thickness where the legs 132, 134, 136, 138 and ribs 131, 139 are joined. This configuration aids in providing proper balance and low distortion of the cross-section of the boot 100 when it rotates rapidly as the constant velocity joint 10 rotates.

As best seen in FIG. 1, the boot 100 is attached to a constant velocity joint 10 by a first flat ring clamp 110 of conventional design encircling the smaller end opening 104 and by a second such clamp 112 encircling the larger end opening 109. The clamps 110, 112 may be of metal or other suitable material and should be adjustable so they can be tightened firmly against the exterior of each end opening. To facilitate seating and permanent stability of the clamps 110, 112, each of the end openings 104, 109 has an external clamp groove 111, 113 encircling it in which the ring clamp 110, 112 sits.

Turning now to FIG. 3, an additional feature of the invention, which permits the boot 100 to be economically adapted to a wide variety of constant velocity axle assemblies can be seen. As mentioned previously, constant velocity joints are used in a variety of motor vehicles and, with the increase in sales of front wheel drive vehicles, increase in this variety is expected. Several manufacturers and several different sizes of constant velocity joints are currently in use. These may differ not only in the size and length of the axle shaft 70 and housing 60 to which a boot 100 must be fitted, but also in the shape of the surface to be contacted by the interior of the end openings 104, 109 of the boot 100. Clearly, it is important that a tight, leak-proof seal be obtained between the boot 100 and the axle shaft or housing. To adapt the invention to the various axle shaft and housing types and sizes, an internal diameter adapter ring 150 is used. Like the boot 100, it is formed with at least one seam or split, so that it can be placed around the joint 10 without disassembly. No particular shape is required for this seam, except that the resulting adapter ring 150 should be of uniform cross-sectional shape and thickness. The interior surface of the adapter ring 150 is configured to cooperate with whatever grooves or surface features are present on the axle shaft 70 or housing 60. The exterior surface of the adapter ring 150 is configured to mate precisely with the interior surface of the end openings 104, 109 of the boot 100, with the thickness of the adapter ring 150 for a given application being chosen so that no crimping or stretching of an end opening is necessary. The adapter ring 150 shown in FIG. 3 is just one of many configurations which can be made, as can be seen in FIGS. 4A–4E which show other configurations for the adapter ring 150, suitable for various different axle or housing configurations.

As best seen in FIG. 6, a length adapter ring 180 may be used to extend a given boot size to fit a longer joint 10 without stretching out the convolutions of the bellows. In this case, the length adapter ring 180 would fit under the external clamp groove 113 of the boot 100 to be extended. For greater security, a second clamp 181 is used to hold the adapter ring 180, in addition to the clamp 112 which would be present in clamp groove 113.

Both the boot 100 and the adapter rings 150, 180 are, in the preferred embodiment, made of a thermoplastic ester-based polyurethane elastomer, a material which is resilient and capable of withstanding repeated flexing at high and low temperatures and is resistant to most chemicals encountered in a vehicle or in a road environment, as well as being waterproof. Such a material is available commercially from a variety of sources. The product designated "PS 79" sold by K. J. Quinn & Co., Inc. of Malden, Mass. is one example of a suitable commercially-available material. This material is injection molded by conventional techniques to form the boot-halves and adapter rings shown in the accompanying figures. To facilitate molding, a mold lubricant can be blended into the elastomer. When the boot halves are identical as shown in FIG. 2, only one mold is necessary to produce both halves. This makes the tooling more economical.

In accordance with applicants' invention, the mating edges of the two boot halves forming the longitudinal seams of a boot body 100 are interbonded to one another by a continuous, flexible, thin bond. As can best be seen in FIGS. 1 and 2, when channel 133 on wall 106 is mated with the corresponding edge of wall 108, there is a contact surface within the longitudinal seam which extends from one clamp groove 111 to the other 113. In the preferred embodiment in which the mated edges involve one straight edge and one U-shaped channel, the cross-section of the contact surface is U-shaped and is internal to the seam 130. Accordingly, a strong, continuous, flexible seal and joint can be formed when the mating edges are interbonded with a continuous, flexible, thin bond formed chemically at the contact surface. The same interbonding is preferably used at both seams 130, 135. Because the bond is thin, it is flexible, and it causes little or no change in the important flexing ability of the boot as a whole and adds minimal thickness or weight to a seam. Because the bond is continuous, it is uniformly strong along its length and provides a substantially watertight seal. Because it is internal, the bond is less exposed to the harsh road environment, and it adds no projections which might catch on nearby parts.

The seams 130, 135 of the boot halves may be joined by several related interbonding methods or bonds when the above-discussed material is used. One approach involves the use of a solvent to dissolve a portion of the elastomer at the seam so that a "weld" consisting of a region of the elastomer itself is formed. This makes the boot resemble in strength a continuous boot structure manufactured without any seam, although there is a thin, flexible bonding layer at which the solvent has had its welding effect before evaporating. One suitable bonding method is to use a liquid solvent such as dimethyl-formamide (DMF). This liquid is applied to all surfaces to be joined along the edges to be mated. The surfaces are then brought together and clamped or held stationary for forty to sixty minutes (or fifteen to thirty minutes with heat applied) until the bond is secure. A second method is to use a plastic adhesive dissolved in a solvent such as DMF. The concentration of the adhesive in the solvent can vary over a range of from one to fifty percent by weight, depending on the desired consistency of the mixture, drying time, bonding time, and other factors. The solvent-adhesive mixture is used in much the same way as the pure solvent. A third method which can be used is a variation of the second. With this method an activator such as methacrylate is added to the previously described adhesive-solvent mixture. The activator will work when used in amounts varying from trace amounts up to about five percent by weight, again depending on desired drying time, bonding time and other factors. The same bonding procedure is used as with the other methods.

The liquid solvent DMF in its pure form is a thin fluid which, in some environments, is difficult to apply to and keep on the surfaces to be bonded. One solution to this which has been found useful is to add to and dissolve in the solvent a small amount of the raw material from which the boot is made, thereby increasing the viscosity of the solvent mixture. An example of a workable mixture which has been used by applicants is one gram of granular "PS 79" elastomer mixed with four grams of DMF.

An adhesive alone may also be used to form the bond between the mating surfaces of the seams 130, 135. For a boot made from the preferred thermoplastic ester-based polyurethane elastomer, a cyanoacrylate adhesive can be used to form a suitable bond.

An additional feature of the invention can be seen in FIGS. 5A and 5B, which show a grease fitting 160 used to fill the boot 100 with lubricant. The grease fitting 160 is a narrow slit or passage large enough to accommodate a needle-nose grease gun 170. The slit for the grease fitting 160 begins near the outer edge of a clamp groove 111 and extends toward the interior surface of the boot 100 to end at a point inside the clamp groove 111. As can be seen in FIGS. 5A and 5B, the needle-nose grease gun 170 can be used to force open the grease fitting 160 to permit lubricant to be injected into the interior of the boot 100. For convenience in permitting air to escape as lubricant is inserted, each end of the boot 100 can include such a grease fitting 160, with only one being used for filling. The slit of the grease fitting 160 is formed by removing little or no material so that when the clamp ring 110 is tightened down in the groove 111, the slit is completely closed to make a leak-proof seal. If desired, a slight bump (not shown) could be formed in the clamp groove 111 above the grease fitting 160 so that extra pressure from the clamp ring 110 would be focused on the grease fitting 160 to more tightly close it.

A further feature of the preferred embodiment can be seen in FIG. 1. As shown in that figure, the thickness of the legs 132, 134 of the channel 130 and, similarly, the thickness of the legs 136, 138 of the channel 135 varies. In particular, the legs are thinner in the "valleys" of the bellows (i.e., those portions of the convolutions which ordinarily are closer to the shaft 70) than at the "peaks" or the sides of the "peaks". This enhances the durability of the boot 100 against gradual deterioration through frequent flexing of the "valley" areas. The thinner areas are achieved by tapering the thickness of the legs near the bottom of the "valleys" so that the points of minimum thickness are at the "valley" bottoms.

The invention is used in the following manner. After the old boot is removed from the joint 10, any contaminated lubricant should also be removed and the joint 10 checked for damage. Damaged joint parts should be replaced; otherwise, there is no need to disassemble the joint 10. A matched pair of boot halves 105, 107 and any necessary adapter rings 150, 180 should be selected to fit the axle shaft 70 and housing 60 of the joint 10 to be repaired. No lubricant or other foreign material should be permitted to touch the surfaces to be bonded together. The welding solvent (or solvent/adhesive or solvent/adhesive/activator) solution or the adhesive should be applied to the mating surfaces just before the boot halves 105, 107 are placed around the axle shaft 70 and housing 60 with the mating surfaces pressed together. The bellows configuration and the channel-and-mating-edge construction make a self-aligning joint when each plain edge is inserted into a channel. Small temporary pinch clamps (not shown) pressing the ribs 131, 139 against the corresponding outer channel legs 132, 136, respectively, may also be used to aid formation of a strong bond.

If an adapter ring 150 or 180 is used, it may be placed in position around the axle shaft 70 or housing 60 before the boot halves 105, 107 are used, joining its seam with solvent if desired. The contact surfaces between the interior of the boot 100 under the clamp grooves 111, 113 and the exterior of the associated adapter rings may also be bonded with solvent, if desired. The pieces to be bonded should be held in place against each other for about thirty seconds. The clamp rings 110, 112 should then be installed in the clamp grooves 111, 113 provided. The rings 110, 112 should be tightened until a tight seal exists between the boot 100 and the housing 60 or axle shaft 70 and/or between the boot 100 and any adapter rings used. The clamp rings 110, 112 will hold the adapter rings in place even if no solvent has been used on them. The resilience of the elastomer helps keep the seal tight against the axle shaft 70 or housing 60.

If the particular boot model used has a fitting for injecting lubricant, lubricant may be applied to the joint 10 after the boot surfaces are bonded. The boot should not be over-filled with lubricant, and it may be necessary to slightly loosen one of the clamp rings 110, 112 to allow air to escape as lubricant is added.

In summary, it will be seen from the above discussion that the present invention involves an improved boot for rotatable flexible joints which permits boot replacement without disassembling the joint, leading to significant labor savings. The boot has at least one split or seam which permits it to be placed around the joint. A solvent or adhesive system is then used to seal the seam by forming a thin, flexible bond between the mating surfaces of the seam. With the aid of clamp rings at the ends of the boot, this provides a sealed enclosure around the joint. The polyurethane elastomer from which the boot preferably is made not only is particularly suited to producing a strong, solvent-welded seam but also has the flexibility, resilience and resistance to lubricants and other chemicals required for motor vehicle or other harsh environments.

The boot can be manufactured by standard injection molding processes. To avoid having to mold a wide variety of boots in various sizes and shapes, adapter rings of different sizes are made for use with the boot. These adapt the boot to the size and shape of the particular shaft or housing portion of the joint to which the boot is clamped. In the preferred embodiment, the boot is made in two identical boot halves which are joined at seams located on opposite sides of the boot for better balance under rotation. When a joint covered by a boot is rotated and operated at an angle, the seams including the bonds are alternately flexed and stretched in rapid sequence. The thin, flexible bonds are able to withstand this. They also prevent penetration by the dirt, water and chemicals to which the boot is exposed. Because the seams add little weight or thickness, the boot holds its shape under rapid rotation.

It will be obvious to one skilled in the art that a number of modifications can be made to the specific embodiments described herein without essentially changing the invention. For example, the ends of the boot may be fastened by means other than the clamp rings shown, and the bellows configuration illustrated may be replaced by other boot body configurations which permit a boot to be flexed or extended as required by joint movement. Also it will be clear that the invention is applicable to nonrotating joints which flex and/or extend and require a protective enclosure. Accordingly, while the preferred embodiment of the invention has been described and illustrated, it is understood that the invention is not limited to the precise construction herein disclosed, and the right is reserved to all changes and modifications coming within the scope of the invention as defined in the appended claims.

Having thus described the invention, what is claimed is:

1. A boot for sealingly enclosing a flexible, rotating joint comprising:
    a boot body of flexible resilient material in the shape of a generally tubular bellows segment including a thin wall, first and second end openings and an external clamp groove encircling each end opening;
    at least one longitudinal seam in said thin wall, running from one end opening to the other and including:
        a first edge of said thin wall, and
        a second edge of said thin wall having
            thin-walled mating means thereon for mating with said first edge at a contact surface, such that the mating means and first and second edges of said thin wall are aligned to form a bellows segment having a substantially annular cross-section, said first edge and the mating means of said second edge being sealed and interbonded to one another by a thin, flexible, continuous, internal bond extending along the contact surface between them so that the seam has substantially the same flexing ability, thickness and weight as the rest of said thin wall; and
    clamping means cooperating with each of said external clamp grooves to encircle each said end opening and compress the interior surface of each end opening radially inward toward the portion of the joint encircled by each said end opening.

2. The boot as recited in claim 1 wherein the mating means of said second edge comprises a channel formed thereon, said channel being open toward said first edge and having sufficient space between its legs to receive said first edge.

3. The boot as recited in claim 2 wherein said channel is generally U-shaped and is symmetrically located on said second edge.

4. The boot as recited in claim 1 wherein the flexible resilient material is a thermoplastic ester-based polyurethane elastomer.

5. The boot as recited in claim 1 wherein the thin, flexible bond is a solvent weld.

6. The boot as recited in claim 5 wherein the solvent weld is a dimethyl-formamide solvent weld.

7. The boot as recited in claim 1 wherein the thin, flexible bond is a solvent-adhesive bond.

8. The boot as recited in claim 7 wherein the solvent-adhesive bond is a dimethyl-formamide solvent and plastic adhesive bond.

9. The boot as recited in claim 1, wherein the boot body comprises two substantially identical boot halves joined with each other at a first longitudinal seam and a second longitudinal seam said seams being located on opposite sides of the boot, substantially 180 degrees apart.

10. The boot as recited in claim 1, further comprising at least one adapter ring cooperating with the interior surface of an end opening and encircling a portion of the joint beneath one of said clamp grooves.

11. The boot as recited in claim 1, further comprising at least one grease fitting passage leading from the exterior of the boot adjacent an outer edge of one end opening, beneath the clamp groove adjacent the end opening, to the interior of the boot.

12. The boot as recited in claim 11, further comprising an additional grease fitting passage leading from the exterior of the boot adjacent an outer edge of the other end opening.

13. A method for sealingly enclosing a flexible, rotating joint comprising the steps of:
    placing around the joint a boot body of flexible, resilient material in the shape of a generally tubular bellows segment including a thin wall, first and second end openings and at least one longitudinal split seam in said wall running from one end opening to the other said seam having first and second edges, at least one edge having thin-walled mating means thereon;
    positioning the first edge of said seam in mating relationship with the second edge of said seam such that the mating means and edges are aligned to form a bellows segment having a substantially annular cross-section and simultaneously forming a thin, flexible, continuous, internal bond and seal between said first and second edges so that the seam has substantially the same flexing ability, thickness and weight as the rest of said thin wall; and
    clamping each said end opening with clamping means which encircle the end opening and compress the interior surface of each end opening radially inward toward the portion of the joint encircled by said end opening.

14. The method recited in claim 13 wherein the step of forming a thin, flexible bond comprises forming a solvent weld.

15. The method recited in claim 14 wherein the step of forming a thin, flexible bond comprises forming a dimethyl-formamide solvent weld.

16. The method recited in claim 13 wherein the step of forming a thin, flexible bond comprises forming a solvent-adhesive bond.

17. The method recited in claim 16 wherein the step of forming a thin, flexible bond comprises forming a dimethyl-formamide solvent and a plastic adhesive bond.

18. A method for sealingly enclosing a joint comprising the steps of:
- placing around the joint a boot body of flexible, resilient material in the shape of a generally tubular bellows segment including a thin wall, first and second end openings and at least one longitudinal split seam in said wall having first and second edges and running from one end opening to the other;
- positioning the first edge of said seam in mating relationship with the second edge of said seam such that the edges are aligned to form a bellows segment having a substantially annular cross-section and simultaneously forming a thin, flexible bond between said first and second edges with dimethyl-formamide solvent and plastic adhesive, using a methacrylate activator; and
- clamping each said end opening with clamping means which encircle the end opening and compress the interior surface of each end opening radially inward toward the portion of the joint encircled by said end opening.

19. A boot for sealingly enclosing a joint comprising:
- a boot body of flexible resilient material in the shape of a generally tubular bellows segment including a thin wall, first and second end openings and an external clamp groove encircling each end opening;
- at least one longitudinal seam in said thin wall, running from one end opening to the other and including:
  - a first edge of said thin wall,
  - a second edge of said thin wall having thin-walled mating means thereon for mating with said first edge at a contact surface, such that the mating means and first and second edges of said thin wall are aligned to form a bellows segment of substantially annular cross-section, and
  - bonding means for forming a thin, flexible, continuous, internal bond and seal extending along the contact surface between the first edge and the mating means of said second edge so that the seam has substantially the same flexing ability, thickness and weight as the rest of said thin wall; and
- clamping means cooperating with each of said external clamp grooves to encircle each said end opening and compress the interior surface of each end opening radially inward toward the portion of the joint encircled by each said end opening.

20. A boot kit for sealingly enclosing a joint comprising:
- a boot body of flexible resilient material in the shape of a generally tubular bellows segment including a thin wall, first and second end openings, an external clamp groove encircling each end opening and at least one longitudinal split seam in said wall, running from one end opening to the other and including:
  - a first edge of said thin wall, and
  - a second edge of said thin wall having thin-walled mating means thereon for mating with said first edge at a contact surface, such that the mating means and first and second edges of said thin wall are aligned to form a bellows segment having a substantially annular cross-section;
- means for forming a thin, flexible, continuous, internal bond and seal extending along the contact surface between the first edge and the mating means of said second edge so that the seam has substantially the same flexing ability, thickness and weight as the rest of said thin wall; and
- clamping means cooperating with each of said external clamp grooves to encircle each said end opening and compress the interior surface of each end opening radially inward toward the portion of the joint encircled by each said end opening.

* * * * *